United States Patent
Faramarzpour

(10) Patent No.: US 9,106,857 B1
(45) Date of Patent: Aug. 11, 2015

(54) DYNAMIC FIXED-PATTERN NOISE REDUCTION IN A CMOS TDI IMAGE SENSOR

(71) Applicant: TELEDYNE DALSA INC., Waterloo (CA)

(72) Inventor: Naser Faramarzpour, Kitchener (CA)

(73) Assignee: Teledyne DALSA, Inc., Waterloo (CA)

( * ) Notice: Subject to any disclaimer, the term of this patent is extended or adjusted under 35 U.S.C. 154(b) by 0 days.

(21) Appl. No.: 14/273,832

(22) Filed: May 9, 2014

(51) Int. Cl.
*H04N 5/374* (2011.01)
*H04N 5/363* (2011.01)

(52) U.S. Cl.
CPC .............. *H04N 5/3743* (2013.01); *H04N 5/363* (2013.01)

(58) Field of Classification Search
CPC ..... H04N 5/372; H04N 5/2176; H04N 5/361; H04N 5/367; H04N 5/3675; H04N 5/2175; H04N 5/359; H04N 5/3743; H04N 5/363
See application file for complete search history.

(56) References Cited

U.S. PATENT DOCUMENTS

| | | | |
|---|---|---|---|
| 5,514,865 A | 5/1996 | O'Neil | |
| 5,544,338 A * | 8/1996 | Forslund | 711/217 |
| 5,925,875 A | 7/1999 | Frey | |
| 6,914,627 B1 | 7/2005 | Dong | |
| 8,428,385 B2 * | 4/2013 | Whiteside et al. | 382/260 |
| 2004/0051797 A1 | 3/2004 | Kelly et al. | |
| 2004/0252201 A1* | 12/2004 | Meitav et al. | 348/211.3 |
| 2009/0009645 A1* | 1/2009 | Schrey et al. | 348/308 |
| 2011/0279725 A1* | 11/2011 | Cazaux et al. | 348/308 |

* cited by examiner

*Primary Examiner* — Aung S Moe
(74) *Attorney, Agent, or Firm* — Gowling Lafleur Henderson LLP

(57) ABSTRACT

A system and method for limiting fixed pattern noise (FPN) in a time delay and integration (TDI) mode of operation of a complementary metal oxide semiconductor (CMOS) imaging device is disclosed. The system and method provide for each line time, selecting a pixel for each column of photosensitive elements in the along track direction to capture dark information such that the selected pixel does not correspond to a portion of a scene that was previously selected to capture dark information in a current TDI period. The dark information for the selected pixels is captured and summed for each column of photosensitive elements. This sum is then used during a next TDI time period to subtract FPN effects from the output of the corresponding column. This allows the dark sum information to be constantly updated while the image sensor is in use while only decreasing the responsivity by (N−1)/N relative to an N pixel column of a traditional TDI operation.

12 Claims, 4 Drawing Sheets

DYNAMIC FIXED-PATTERN NOISE REDUCTION IN A CMOS TDI IMAGE SENSOR

FIELD

The present disclosure relates generally to image sensors. More particularly, the disclosure relates to fixed pattern noise reduction in a CMOS time delay and integration sensor.

BACKGROUND

Time delay and integration (TDI) is an imaging technique that uses an area array image sensor to capture images from an imaging platform that is moving relative to the imaged object or scene. As the object or scene moves across the array, the image sensor takes multiple samples and sums these samples in order to improve the signal to noise ratio as compared to a single line capture of the image sensor. This improvement to signal to noise ratio makes TDI imaging techniques particularly well-suited to applications with low light levels or fast moving objects. Example applications can include medical imaging, machine vision, roll or conveyor belt inspection systems or terrestrial imaging from aircraft or satellites.

Conventionally, charge-coupled device (CCD) technology has been used for TDI applications because CCDs intrinsically operate by shifting charge from pixel to pixel across the image sensor. This shifting of charge allows the CCD image sensor to accomplish the integration (or adding) of the multiple samples without complex circuitry to perform the integration operation and the accompanying noise. However, CCD technology is relatively expensive to fabricate and CCD imaging devices consume much more power than comparably sized devices implemented using complementary metal-oxide semiconductor (CMOS) technology.

Implementing a TDI sensor using CMOS technology not only allows for a lower power designs but also allows for the integration of other electronics with the TDI image sensor. A CMOS TDI implementation requires additional circuitry to perform the addition or integration that is performed by shifting charges in a CCD. The signal is converted to voltage directly inside the CMOS pixels and requires adder circuitry outside the pixel array. Typically, this is performed in the digital domain after analog-to-digital conversion using a memory element and adder circuits.

Image sensors, including CMOS TDI imaging devices, can produce an undesirable response known as fixed pattern noise (FPN). FPN produces a non-image pattern that is caused by variance in the pixel response and non-uniformity of the circuitry used to read the pixel response. This non-uniformity can be the result of manufacturing constraints and environmental conditions that cause the pixels to have different responses despite receiving substantially similar levels of light.

One approach for correcting fixed pattern noise errors employs factory calibration of the detector array. Factory calibration involves exposing the array to a uniform source and tabulating the response of each detector in the array. The tabulated entries consist of gain and offset corrections for each detector in the array. The entries in the table can be applied against corresponding detectors to generate a corrected image. The factory calibration solution, however, suffers from multiple drawbacks. First, the pixel offset errors may not be linearly dependent, rather they may have non-linear temperature variations. Thus, factory calibration must take place over a broad range of temperatures to perform effectively. Second, this solution cannot correct for short-term temporal variations in pixel offset error that occur during operation of the array. For instance, variations in temperature of the detector array can create significant offset variations over time. Finally, this method requires recalibration to correct for long-term unpredictable changes in pixel offset errors that occur as the array components age.

An alternative approach eliminates the disadvantages associated with factory calibration by calibrating the focal plane array while it is in use. This is done by placing a rotating plate in front of the detector array, such that the array is alternately exposed to the image under observation and to a signal of known intensity. The fixed pattern noise is removed by subtracting a detector's response to the known signal from the detector's response to the observed image.

This solution has two drawbacks. First, by requiring a means for alternately exposing the array to the observed image and to a signal of known intensity, this solution requires additional complex mechanical or optical elements. Second, by requiring that the focal plane array spend time viewing a signal of known intensity instead of the scene under observation, this solution inevitably degrades the array's ability to track fast moving objects and reduces the potential signal to noise ratio of the sensor output. This approach is also not feasible when using TDI because you cannot stop to capture dark information without losing information about the scene.

O'Neil, in U.S. Pat. No. 5,514,865 which is incorporated herein by reference, discloses another approach for correcting spatial non-uniformities in a detector array. The O'Neil system employs a dithering system that spatially dithers the observed image across the detector array to correct the gain and offset errors in the array of detectors. The detector array line of sight is moved between consecutive image frames according to a predetermined pattern. This dithering of the array's line of sight causes different detectors to image the same location in the scene during different image frames, and causes two adjacent detectors to scan between the same two points in the scene during a cycle of the predetermined dither pattern. Theoretically, if two ideal detectors view the same part of an image then the two ideal detectors generate the same response to that part of the image. Differences existing in the response of two detectors viewing the same part of an image can accordingly be characterized as error in the detector response.

Dong, in U.S. Pat. No. 6,914,627 which is incorporated herein by reference, discloses another approach for correcting FPN noise. The Dong system uses a reference row of the pixel arrays that is covered by a light shield to collect a fixed pattern noise signal that can then be subtracted from the signals from the pixel array to cancel the fixed pattern noise.

A need therefore exists for improved fixed-pattern noise-reduction in a CMOS TDI image sensor. Accordingly, a solution that addresses, at least in part, the above and other shortcomings is desired.

SUMMARY

According to a first aspect of the disclosure, a method is provided for limiting fixed pattern noise (FPN) in a time delay and integration (TDI) mode of operation of a complementary metal oxide semiconductor (CMOS) imaging device, the method comprises for each line time, selecting a pixel for each column of photosensitive elements in the along track direction to capture dark information such that the selected pixel does not correspond to a portion of a scene that was previously selected to capture dark information in a current TDI period; for each line time, capturing dark information for the selected pixel to capture FPN effects associated with the selected pixel; summing the dark information captured from each pixel for each column of photosensitive elements over the current TDI period to provide a dark information sum for each column of photosensitive elements; and correcting TDI pixel output for each column during a next TDI period using the corresponding dark information sum during each line time of the next TDI period. In some aspects, the method can include repeating the selecting, capturing, summing, and correcting steps for each subsequent TDI time period. In some aspects, correcting the TDI pixel output for each column can include subtracting the corresponding dark information sum during each line time. In some aspects, capturing dark information for the selected pixel can include preventing transfer of photo-generated charged into a sense node of the selected pixel. In some aspects, the dark information sum can be the sum of the dark capture information for each pixel in a column. In yet other aspects, the effective TDI responsivity decreases by (N−1)/N for an N pixel column compared to traditional TDI operation resulting from the capturing of dark information. In some aspects, correcting TDI pixel output can be performed on the same chip as the column of photosensitive elements or on a different chip as the column of photosensitive elements.

According to another aspect of the disclosure, a complementary metal oxide semiconductor (CMOS) imaging device operating in a time delay and integration (TDI) mode for limiting fixed pattern noise (FPN), capturing a scene moving with respect to the imaging device is provided. The device comprises a photosensitive imaging array having at least one column of photosensitive elements; a TDI memory element and addition module for storing and summing output of each photosensitive element for each line time; an FPN memory element and addition module for storing and summing dark information captured from each photosensitive element in the at least one column over a current TDI period to provide a dark information sum for the at least one column of photosensitive elements; and a dark capture control module for selecting a photosensitive element of the at least one column of photosensitive elements in the along track direction to capture dark information such that the selected photosensitive element does not correspond to a portion of a scene that was previously selected to capture dark information in a current TDI period. In some aspects, the imaging device can further include an FPN correction module for correcting TDI output for the at least one column using summed dark information from the FPN memory element stored during the previous TDI period. In a related aspect, the FPN correction module can be located on-chip or off-chip relative to the photosensitive imaging array. In another aspect, capturing dark information for the selected pixel can include the dark capture control module preventing transfer of photo-generated charged into a sense node of the selected pixel of the photosensitive imaging array.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The term "integration", as used herein, refers to both charge generation within a pixel during a period when the pixel is generating photocharge and also to the summing of TDI frames from the photo array. It should be clear from the context used herein which meaning is intended. The term "TDI period" refers to the time capture all the frames of the scene. For example, with a detector array with N stages, the TDI period refers to N×the line time.

The term "column", as used herein, refers generally the alignment of pixels in the photosensitive array arranged in the along track direction in which the scene moves relative to the imaging device during TDI operation.

Figure 1:
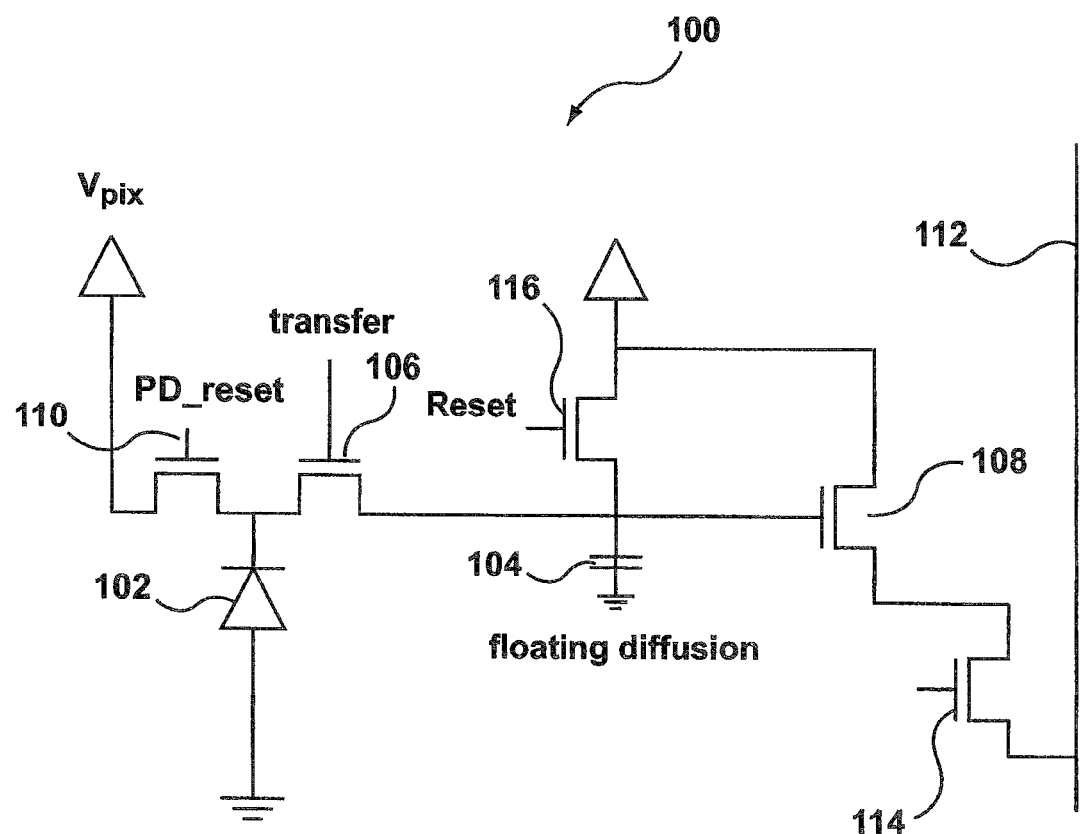
FIG. 1 illustrates a five transistor CMOS pixel with a global shutter.

Referring to FIG. 1, the architecture of a 5 transistor (5T) CMOS pixel 100 is illustrated. CMOS pixel 100 includes a photodetector 102, typically a pinned photodiode, a floating diffusion 104, a transfer gate 106 that transfers signal from the photodetector 102 to floating diffusion 104, and a source-follower buffer transistor 108. Floating diffusion 104 acts as a storage node to store the photo signal from photodiode 102. Source follower buffer transistor 108 amplifies the signal from CMOS pixel 100 so that the signal is not obscured by noise on column bus 112 that is used to connect other CMOS pixels in the column together in a CMOS pixel array.

In operation, signal charge is collected by photodetector 102 during the integration period to generate the photo signal from incident radiation. Prior to the integration period, a photodetector reset gate 110 is held high and the photo charge is drained to Vpix. Shutter control is provided by photodetector reset gate 110 that can control the integration period of CMOS pixel 100. Integration begins when photodetector reset gate 110 is held low and continues until transfer gate 106 is clocked high to transfer the signal charge to floating diffusion 104. The charge from floating diffusion 104 is converted to a voltage that is applied to column bus 112 by row selection gate 114. In an array of CMOS pixels each row of a column can be read sequentially and sampled from column bus 112. After reading CMOS pixel 100, floating diffusion 104 is reset to Vpix through reset gate 116.

Dark information of CMOS pixel 100 can be captured and used for fixed pattern noise correction. This dark information is extracted from the pixel by not shuttering of the photo-generated charge into the pixel sense node. Dark information can be read by capturing the signal from floating diffusion 104 after reset gate 116 is applied without transferring the signal from the photodetector 102 through transfer gate 106. This approach can also be used with 4 transistor pixel embodiments that do not include photodetector reset gate 110.

Figure 2:
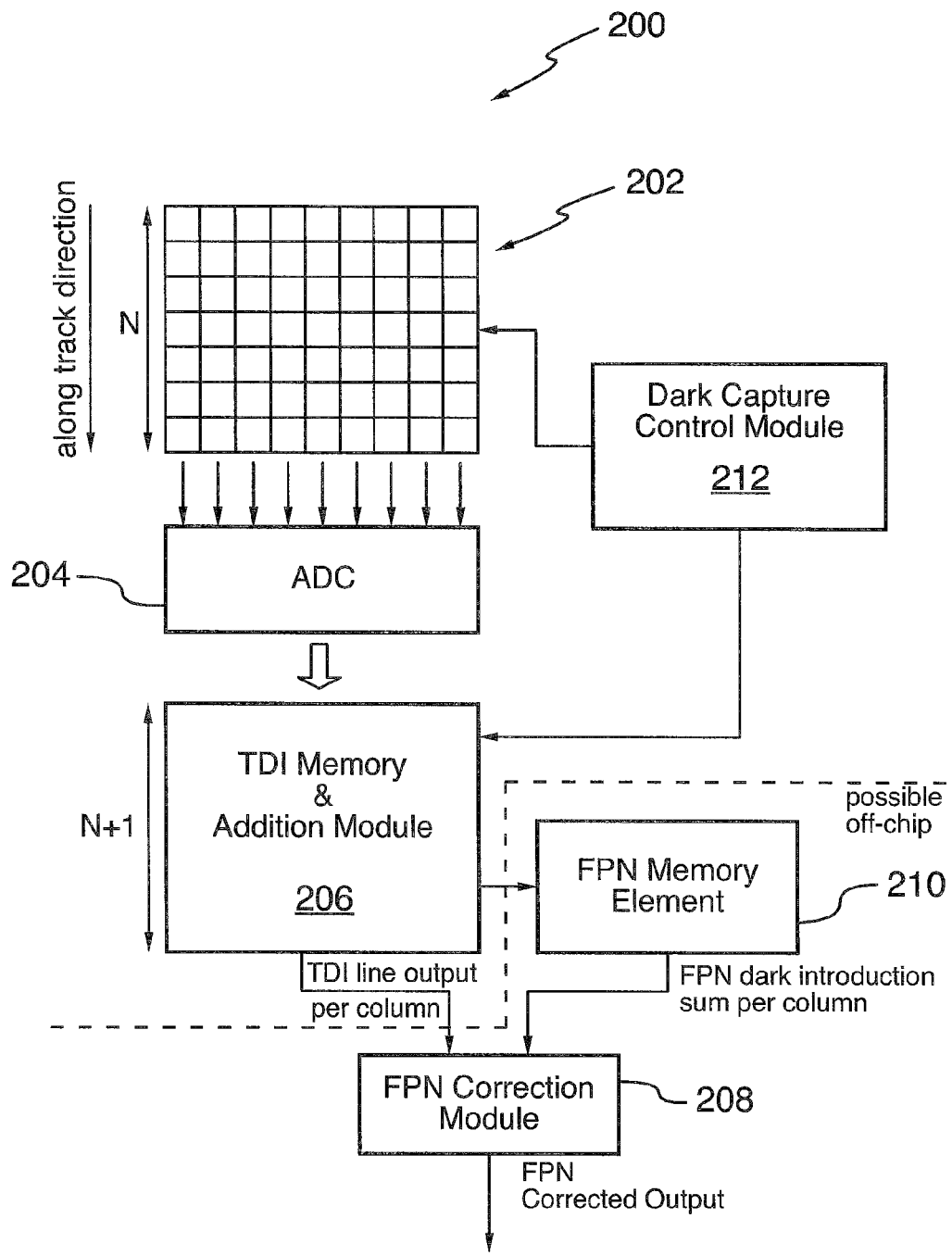
FIG. 2 is a block diagram of a CMOS imaging device operating in a time delay and integration (TDI) mode for limiting fixed pattern noise.

Referring now to FIG. 2, shown is block diagram of a CMOS imaging device 200 operating in a time delay and integration (TDI) mode for limiting fixed pattern noise. Pixel array 202 is an array of CMOS pixels, such as that shown in FIG. 1 that are used to capture a scene that is moving in an along track direction with respect to pixel array 202. Pixel array 202 is illustrated as having N=7 stages such that the TDI period will include 7 line times to capture the scene as it moves with respect to the pixel array. For each line time, the output of pixel array 202 is converted to a digital output by analog-to-digital converter 204 and then processed by the TDI Memory and Addition Module 206.

TDI Memory and Addition Module 206 includes a memory, digital adder circuit and control circuits to provide the TDI functionality of adding subsequent samples from each TDI line time. TDI Memory and Addition Module 206 sums the output from analog-to-digital converter 204 and previously sampled (and summed) TDI output from the memory.

TDI Memory and Addition Module 206 provides a TDI line output for each column of pixel array 202. The TDI line output is the summed output of all the TDI stages of the pixel array 202. In the example shown in FIG. 2, TDI Memory and Addition Module 206 would provide 9 outputs corresponding to each column of pixel array 202 and each output would include the sum of N=7 TDI line times.

Output from TDI Memory and Addition Module 206 is corrected by FPN Correction Module 208 to account for fixed pattern noise of pixel array 202. FPN Correction Module 208 subtracts a fixed pattern noise level for each column that is stored in FPN Memory Element 210. Correcting FPN using FPN Correction Module 208 and FPN Memory Element 210 can be handled on-chip (i.e. on the same silicon as pixel array 202, ADC 204, and memory) or off-chip.

In contrast to traditional approaches, FPN Memory Element 210 is updated for each TDI period without using separate dark rows or shuttering the entire pixel array 202. FPN Memory Element 210 is updated using the same pixels that are involved in the TDI imaging. Dark Capture Control Module 212 controls pixel array 202 to direct certain pixels (one for each column) to collect dark information for a TDI line time and sum that result with a previously stored dark information (for that column) stored in TDI Memory and Addition Module 206. For each TDI line time a pixel is selected for each column of the pixel array 202 to capture dark information. Dark Capture Control Module 212 arranges this such that the selected pixel does not correspond to a portion of the scene that was previously selected to capture dark information in the current TDI period. Selection of pixels to capture dark information for a column is similar to the solution to the N-queens puzzle (also known as the eight queens problem) that requires that no two queens share the same row, column, or diagonal for N columns over N TDI line times. This is illustrated in the selection of the dark information in the TDI time period of FIG. 3.

The captured dark information is summed by TDI Memory and Addition Module 206 such that after a TDI period (i.e. capturing N line times) there will be a dark information sum that will include dark information from each pixel in the column that can be used for FPN correction in the next TDI period. This dark information sum is provided by TDI Memory and Addition Module 206 to FPN Memory Element 210 to allow updating the FPN correction factor during TDI capture. Capturing dark information using pixel array 202 during the TDI capture period results in reduced responsivity of each column of pixel array by factor of (N−1)/N. In order to store and sum this dark information, the memory of TDI Memory and Addition Module 206 can also have an additional $N^{th}+1$ stage.

Figure 3:
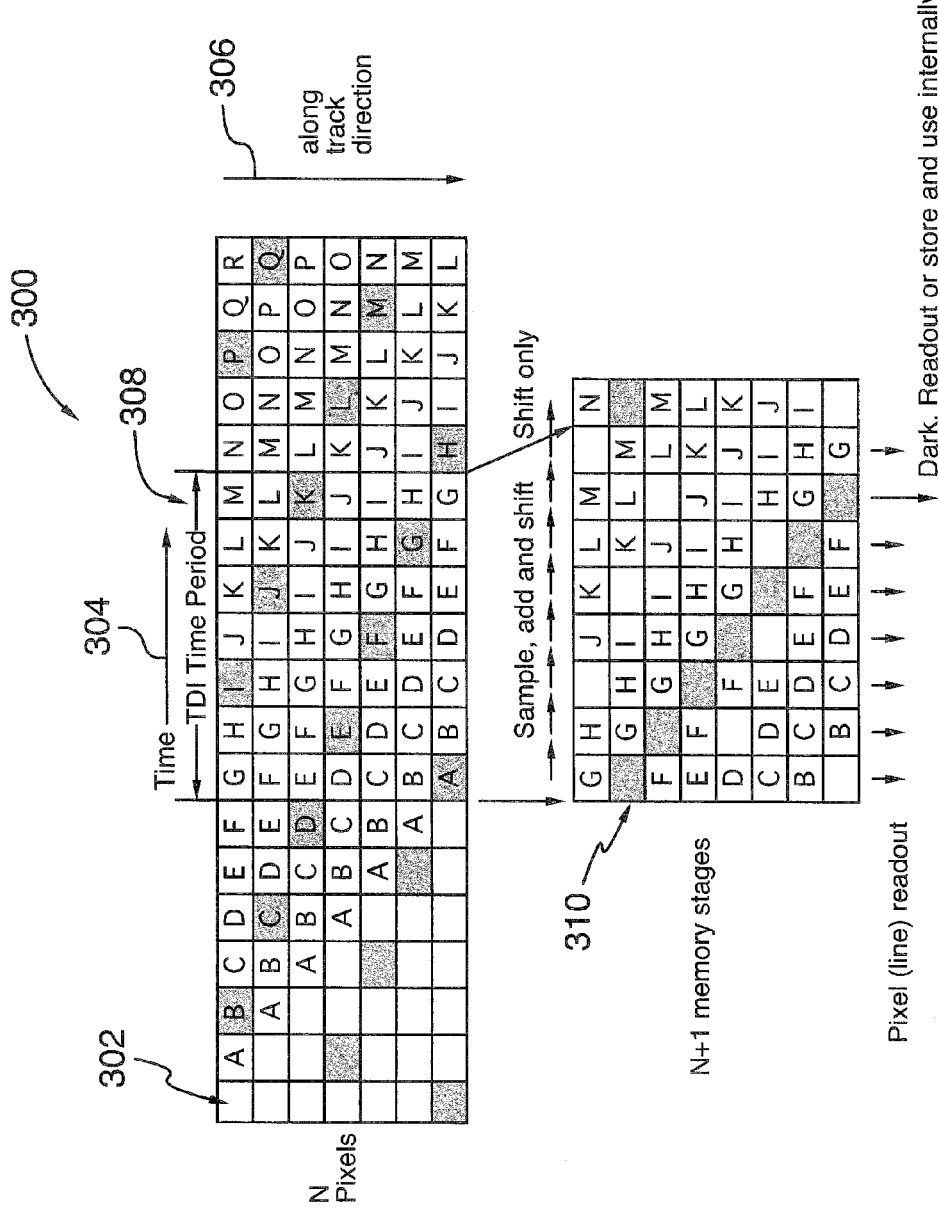
FIG. 3 is a block diagram illustrating selecting a different pixel over time to capture dark information for a single column of a CMOS imaging device.

Referring now to FIG. 3, shown is a block diagram 300 illustrating an example of a single column of pixels 302 used for capturing dark information along with the TDI scene. In the example, the TDI scene is represented by the alphabet (e.g. A, B, C, D, etc.) The horizontal direction, indicated by arrow 304, illustrates that passage of time and the vertical direction, indicated by arrow 306, illustrates the movement of the TDI scene (e.g. ABCDEF . . . ) relative to the column of pixels 302, shown moving downwards on the page. Memory stage 310 is illustrated as a single column of memory elements changing with respect to time (arrow 304). Memory stage 310 includes an additional stage to store the dark information of the column of pixels along with signal from each of the pixels. Thus, for a column of pixels 302 having N elements the corresponding column of memory stage 310 will have N+1 elements, the $N^{th}+1$ element for storing dark information captured from the column of pixels. Block diagram 300 illustrates that for each line time one of the pixels of the column of pixels is used to capture dark information, which is indicated by a darker shaded square in the diagram. This capture of dark information is coordinated so that all parts of the scene will only be missed once due to dark information capture.

Memory stage 310 along with an addition element, similar to TDI Memory and Addition Module 206 described with respect to FIG. 2, will sample output from the column of pixels 302 and add the output to the corresponding memory element to perform the TDI operation. A similar operation is performed in order to capture dark information from each pixel of the column of pixels 302 during the TDI time period 308. For each TDI line time, memory stage 310 produces a TDI pixel output that includes the sum of all the captured portions of the scene or the sum of the dark information captured from each pixel of the column of pixels 302 over the current TDI period 308. The dark information sum can then be subtracted from the TDI output in the subsequent TDI time period to correct for fixed pattern noise effects.

Figure 4:
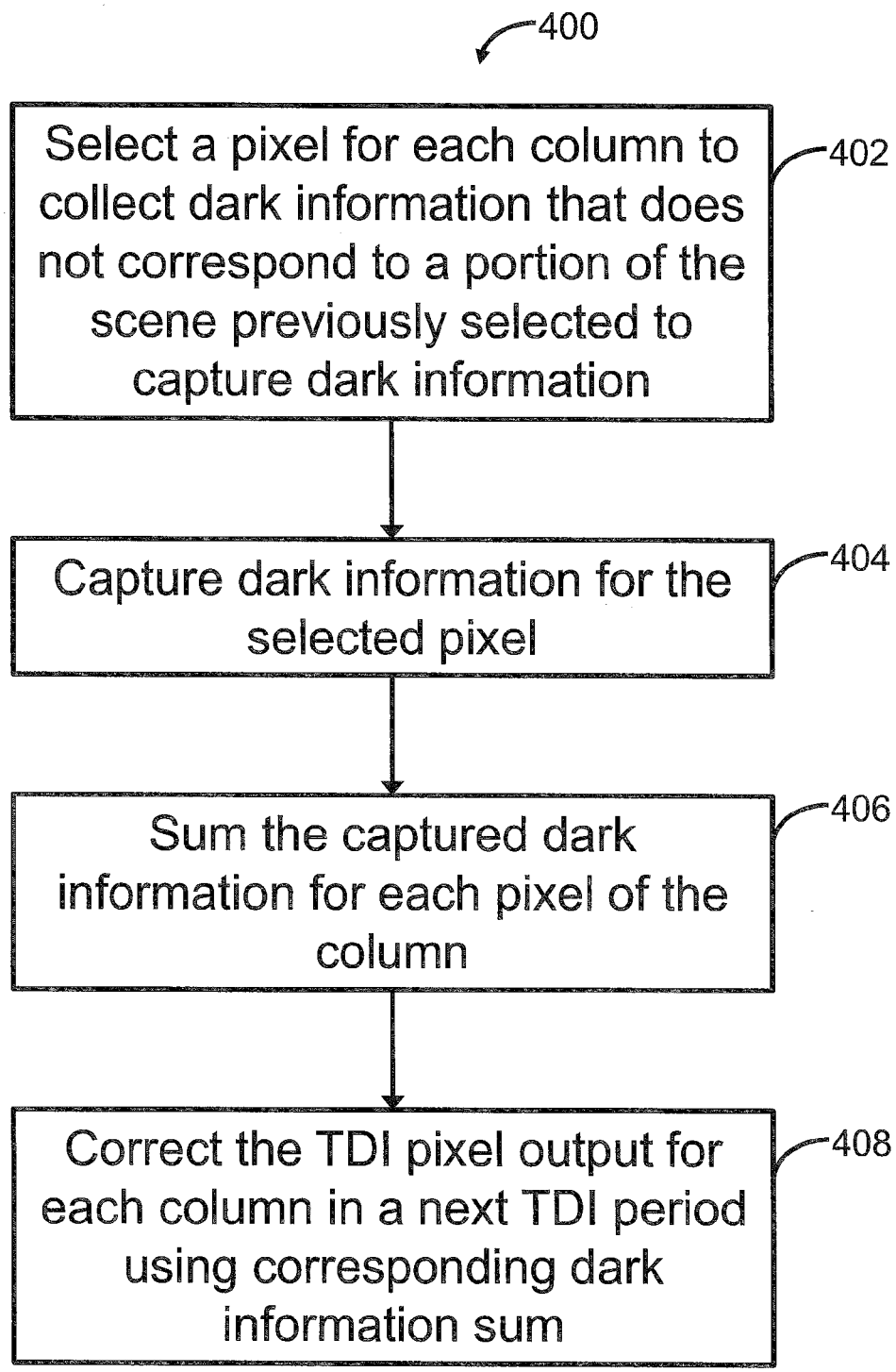
FIG. 4 is a flowchart illustrating a method for limiting fixed pattern noise in a time-delay and integration mode of operation of a CMOS imaging device.

Referring now to FIG. 4, shown is a flowchart illustrating a method 400 for limiting fixed pattern noise in a time-delay and integration mode of operation of a CMOS imaging device. In the first step 402, a pixel is selected for each column of the photosensitive elements of CMOS imaging device in the along track direction to capture dark information such that the selected pixel does not correspond to a portion of a scene that was previously selected to capture dark information during the current TDI period. Next, at step 404, dark information is captured for the selected pixel in order to capture FPN effects associated with the selected pixel. Dark information can be captured by preventing transfer of photo-generated charged into a sense node of the selected pixel as described with respect to FIG. 1. At the same time, other pixels of the column are capturing the scene and summed with the previously captured portions of the scene as stored in a memory according to TDI operation principles. Similarly, at step 406, the dark information that was captured is summed with previously captured dark information over the current TDI period to provide a dark information sum for each column of photosensitive elements.

The dark information sum includes the dark information captured from each pixel of a column is then used in step 408 to correct the TDI pixel output for each column during the each line time of a next TDI period. The pixel output from the memory can subtract the dark sum information to correct for the cumulative fixed pattern noise effects of each pixel in the corresponding column. By continuously updating the dark information sum during each TDI period, the CMOS TDI imaging device is able to account for environmental and other factors that can change during usage and affect the fixed pattern noise of the circuit.

The method 400 can be repeated for each subsequent TDI period to allow the dark sum information to be constantly updated. Other embodiments can allow periodic recalculation of the dark sum information.

While the exemplary embodiments have been described herein, it is to be understood that the invention is not limited to the disclosed embodiments. The invention is intended to cover various modifications and equivalent arrangements included within the scope of the appended claims, and the scope of the claims is to be accorded an interpretation that encompasses all such modifications and equivalent structures and functions.

What is claimed is:

1. A method for limiting fixed pattern noise (FPN) in a time delay and integration (TDI) mode of operation of a complementary metal oxide semiconductor (CMOS) imaging device, the method comprising:
    for each line time, selecting a pixel for each column of photosensitive elements in the along track direction to capture dark information such that the selected pixel does not correspond to a portion of a scene that was previously selected to capture dark information in a current TDI period;
    for each line time, capturing dark information for the selected pixel to capture FPN effects associated with the selected pixel;
    summing the dark information captured from each pixel for each column of photosensitive elements over the current TDI period to provide a dark information sum for each column of photosensitive elements; and,
    correcting TDI pixel output for each column during a next TDI period using the corresponding dark information sum during each line time of the next TDI period.

2. The method of claim 1, further comprising repeating the selecting, capturing, summing, and correcting steps for each subsequent TDI time period.

3. The method of claim 1, wherein correcting the TDI pixel output for each column comprises subtracting the corresponding dark information sum during each line time.

4. The method of claim 1, wherein capturing dark information for the selected pixel comprises preventing transfer of photo-generated charged into a sense node of the selected pixel.

5. The method of claim 1, wherein the dark information sum is the sum of the dark capture information for each pixel in a column.

6. The method of claim 1, wherein effective TDI responsivity decreases by (N−1)/N for an N pixel column resulting from the capturing of dark information.

7. The method of claim 1, wherein correcting TDI pixel output is performed on the same chip as the column of photosensitive elements.

8. The method of claim 1, wherein correcting TDI pixel output is performed on a different chip as the column of photosensitive elements.

9. A complementary metal oxide semiconductor (CMOS) imaging device operating in a time delay and integration (TDI) mode for limiting fixed pattern noise (FPN), capturing a scene moving with respect to the imaging device, the device comprising:
    a photosensitive imaging array having at least one column of photosensitive elements;
    a TDI memory element and addition module for storing and summing output of each photosensitive element for each line time;
    an FPN memory element and addition module for storing and summing dark information captured from each photosensitive element in the at least one column over a current TDI period to provide a dark information sum for the at least one column of photosensitive elements; and,
    a dark capture control module for selecting a photosensitive element of the at least one column of photosensitive elements in the along track direction to capture dark information such that the selected photosensitive element does not correspond to a portion of a scene that was previously selected to capture dark information in a current TDI period.

10. The imaging device of claim 9, further comprising an FPN correction module for correcting TDI output for the at least one column using summed dark information from the FPN memory element stored during the previous TDI period.

11. The imaging device of claim 10, wherein the FPN correction module is located anywhere of on-chip and off-chip from the photosensitive imaging array.

12. The imaging device of claim 9, wherein capturing dark information for the selected pixel comprises the dark capture control module preventing transfer of photo-generated charged into a sense node of the selected pixel of the photosensitive imaging array.

* * * * *